(12) United States Patent
Dong et al.

(10) Patent No.: US 10,408,995 B1
(45) Date of Patent: Sep. 10, 2019

(54) OPTICAL SENSING FIBER

(71) Applicant: Sentek Instrument, LLC, Blacksburg, VA (US)

(72) Inventors: Bo Dong, Blacksburg, VA (US); Anbo Wang, Blacksburg, VA (US)

(73) Assignee: SENTEK INSTRUMENT, LLC, Blacksburg, VA (US)

( * ) Notice: Subject to any disclaimer, the term of this patent is extended or adjusted under 35 U.S.C. 154(b) by 0 days.

(21) Appl. No.: 15/650,079

(22) Filed: Jul. 14, 2017

Related U.S. Application Data

(60) Provisional application No. 62/502,892, filed on May 8, 2017, provisional application No. 62/480,424, filed on Apr. 1, 2017, provisional application No. 62/362,822, filed on Jul. 15, 2016.

(51) Int. Cl.
| | |
|---|---|
| *G02B 6/02* | (2006.01) |
| *G01J 3/26* | (2006.01) |
| *G01J 3/02* | (2006.01) |

(52) U.S. Cl.
CPC ........ *G02B 6/02123* (2013.01); *G01J 3/0218* (2013.01); *G01J 3/26* (2013.01); *G02B 6/0208* (2013.01)

(58) Field of Classification Search
CPC .............. G02B 6/02123; G02B 6/0208; G02B 6/02138; G02B 6/02395; G01J 3/0218; G01J 3/26
See application file for complete search history.

(56) References Cited

U.S. PATENT DOCUMENTS

| | | | |
|---|---|---|---|
| 4,371,838 | A | 2/1983 | Griscom |
| 4,433,291 | A | 2/1984 | Yariv et al. |
| 4,761,073 | A | 8/1988 | Meltz et al. |
| 5,451,772 | A | 9/1995 | Narendran |

(Continued)

FOREIGN PATENT DOCUMENTS

| | | |
|---|---|---|
| CN | 104792715 | 7/2015 |
| WO | 2013055470 | 4/2013 |
| WO | 2015154177 | 10/2015 |

OTHER PUBLICATIONS

Zhuang Wang, etal.; Multiplexed Fiber Fabry—Pérot Interferometer Sensors Based on Ultrashort Bragg Gratings; IEEE Photonics Technology Letters; vol. 19, No. 8, pp. 622-624; Apr. 15, 2007.

(Continued)

*Primary Examiner* — Michael P Wieczorek
(74) *Attorney, Agent, or Firm* — Niels Haun; Dann, Dorfman, Herrell & Skillman

(57) ABSTRACT

Method for creating an optical sensing fiber having a reflective structure integrally disposed therein, comprising: providing an optical fiber having a core and a cladding layer disposed in optical contact with the core, and having a polymer coating layer disposed in contact with and surrounding the cladding layer, the coating layer at least partially transparent in the wavelengths of 390-600 nm; providing a source of electromagnetic radiation having a wavelength in the range of 390-600 nm; and delivering a selected wavelength of the electromagnetic radiation through the coating layer to a selected location within the fiber core or cladding such that the delivered electromagnetic radiation alters the core or cladding to create at least one reflective structure in the core or cladding at the selected location.

38 Claims, 13 Drawing Sheets

(56) References Cited

U.S. PATENT DOCUMENTS

| | | | |
|---|---|---|---|
| 5,627,921 A | 5/1997 | Lidgard et al. | |
| 6,222,973 B1 | 4/2001 | Starodubov | |
| 6,768,825 B2 * | 7/2004 | Maron | G01L 1/246 385/13 |
| 6,993,221 B2 * | 1/2006 | Mihailov | G02B 5/1857 385/37 |
| 7,003,197 B2 | 2/2006 | Andre et al. | |
| 7,019,837 B2 | 3/2006 | Waagaard | |
| 8,737,780 B2 * | 5/2014 | Vallee | B29D 11/00663 385/37 |
| 9,322,969 B2 | 4/2016 | Burov et al. | |
| 9,335,468 B2 | 5/2016 | Wang et al. | |
| 9,651,418 B2 | 5/2017 | Chin et al. | |
| 2006/0013523 A1 | 1/2006 | Childlers et al. | |
| 2007/0062337 A1 | 3/2007 | Dai et al. | |
| 2008/0148777 A1 | 6/2008 | Bise et al. | |
| 2010/0148770 A1 | 6/2010 | Crowe | |
| 2013/0094808 A1 | 4/2013 | Homa et al. | |
| 2014/0152995 A1 | 6/2014 | Dong et al. | |

OTHER PUBLICATIONS

Xiaopei Chen, et al; Micro-air-gap based intrinsic Fabry-Perot interferometric fiber optic sensor; Applied Optics; vol. 45, No. 30; pp. 7760-7766; Oct. 20, 2006.

Zhengyu Huang, et al.; Intrinsic Fabry-Pe/spl acute/rot fiber sensor for temperature and strain measurements; IEEE Photonics Technology Letters, vol. 17, No. 11, Nov. 2005; pp. 2403-2405.

Ki Dong Oh, etal.; Optical fiber Fabry-Perot interferometric sensor for magnetic field measurement; IEEE Photonics Technology Letters; vol. 9, No. pp. 797-799; Jun. 6, 1997.

Stephen J. Mihailov; Fiber Bragg Grating Sensors for Harsh Environments; Sensors 2012, 12, 1898-1918; Feb. 10, 2012.

* cited by examiner

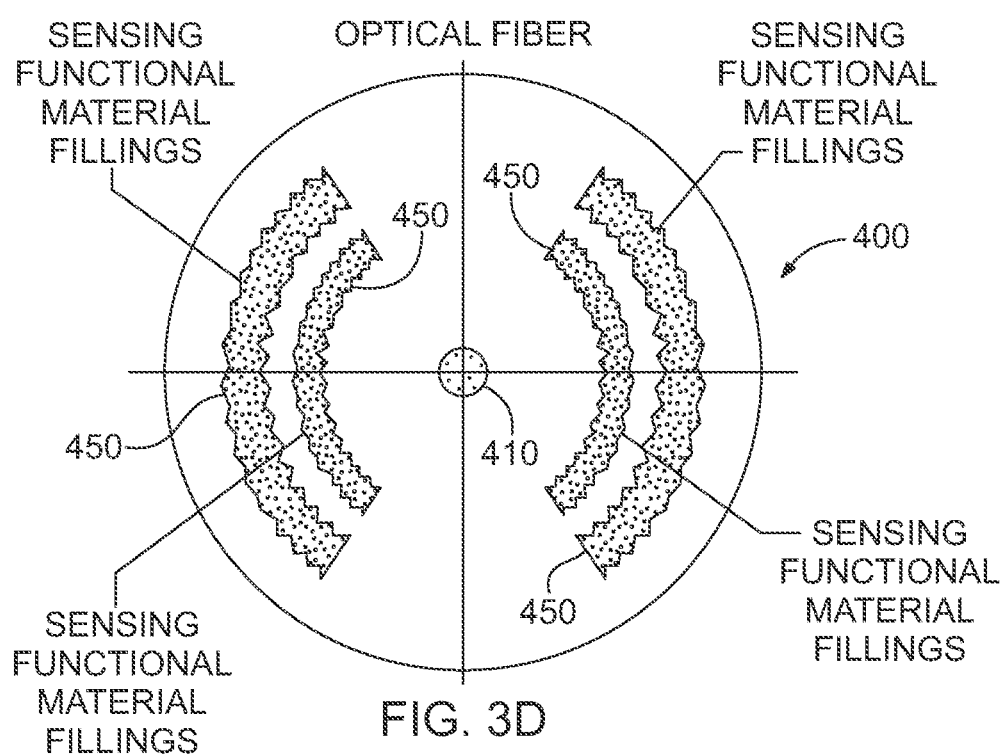

OPTICAL SENSING FIBER

RELATED APPLICATIONS

This application claims the benefit of priority of U.S. Provisional Application Nos. 62/362,822, filed on Jul. 15, 2016; 62/480,424, filed on Apr. 1, 2017; and, 62/502,892, filed on May 8, 2017, the subject matter of which applications are incorporated herein by reference.

FIELD OF THE INVENTION

The present invention relates generally to devices and methods for optical fiber sensing, and more particularly, but not exclusively, to optical sensing fibers having reflective structures disposed in the fiber core or cladding, and/or sensing materials disposed in the fiber cladding.

BACKGROUND OF THE INVENTION

Current efforts to produce gratings in optical telecommunication fibers can suffer from a number of undesirable manufacturing choices including: removal of the fiber coating; use of infrared radiation requiring costly lasers (an IR femtosecond pulse laser system can easily exceed $200K), limiting the types of structures that may be formed; fiber features which are too strongly reflective to be suitable for use in the multiplexing of serial sensors, and so forth.

For example, removal of the fiber coating and recoating, necessitated by the opacity of the coating when excimer laser wavelengths are used, may cause the fiber strength to degrade and also increase the time consumption and therefore the cost of fiber Bragg grating (FBG) fabrication. To solve this coating removal induced problem, FBGs may also be fabricated during the fiber fabrication on a fiber draw tower. The bare glass fiber is exposed to excimer laser induced interference fringes before the fiber coating is applied. This method is effective but requires significant equipment capital investment and the tower operation and maintenance is also costly. In addition, the fiber drawing speed is usually high, typically a number of meters per second, so the control on the grating characteristics and the fabrication yield may be limited.

Accordingly it would be an advance in the art to provide new and useful optical fiber sensors and methods for their production.

SUMMARY

In a first of its aspects, the present invention may relate to optical sensing fibers having serial reflectors fabricated therein according to methods of the present invention. In this regard, the present invention may provide a method for creating an optical sensing fiber having a reflective structure integrally fabricated therein. The method may include providing an optical fiber having a core and a cladding layer disposed in optical contact with the core, and may include a polymer coating layer disposed in contact with and surrounding the cladding layer. The coating layer may be at least partially transparent in the wavelengths of 390-600 nm. A source of electromagnetic radiation may be provided having a wavelength in the range of 390-600 nm, and a selected wavelength of the electromagnetic radiation may be delivered through the coating layer to a selected location within the fiber core or cladding such that the delivered electromagnetic radiation alters the core or cladding to create at least one reflective structure in the core or cladding at the selected location. The at least one reflective structure may include a change in refractive index at the selected location, which may be in the range of $1 \times 10^{-10}$ to 0.32. Alternatively or additionally, the at least one reflective structure may include damage localized to the region of the at least one reflective structure, which may be 0.1 to 1 µm in length along the direction of the fiber axis and 0.1 to 50 µm perpendicular thereto. The reflectance of the at least one reflective structure may be 10% or less.

In certain configurations, the method may provide a plurality of reflective structures. For example, the method may include moving the location of the source of electromagnetic radiation and the optical fiber relative to one another to a plurality of locations to focus electromagnetic radiation at each of the plurality of locations to create a plurality of reflective structures. The at least one reflective structure may include two reflective structures disposed at locations within the core of the fiber to provide a Fabry-Perot interferometer therebetween, and a plurality of Fabry-Perot interferometers may be serially disposed along the length of the fiber to permit distributed sensing along the length of the fiber.

In a second of its aspects the present invention may relate to optical sensing fibers that include a sensing material disposed in the cladding of the fiber, with the sensing material structured to change or respond when the fiber is placed in the presence of a selected measurand. In this regard, the present invention may provide an optical sensing fiber for sensing a selected measurand, having a core and a cladding layer disposed in optical contact with the core, and having first and second sensing materials symmetrically disposed in the cladding layer at opposing locations across the core. The first and second sensing materials comprise different materials. The sensing materials may be structured to exhibit a change in response to the presence of the selected measurand. For example, the measurand may be a magnetic field, and the sensing materials may be a magnetostrictive material that changes its dimensions under the influence of the magnetic field. The sensing materials may be piezoelectric for magnetic field sensing. The cladding layer may include one or more holes extending longitudinally therethrough parallel to the optical axis of the fiber, and the sensing materials may be disposed within the holes.

In addition, the optical sensing fiber may include at least one reflective structure disposed therein along with the sensing materials. The at least one reflective structure may include a discontinuity in refractive index and may include damage to the fiber core. The reflectance of the at least one reflective structure may be 10% or less. The at least one reflective structure may include a plurality of reflective structures, such as a plurality of gratings, serially disposed along the length of the fiber to permit distributed sensing along the length of the fiber. In a particular configuration, the at least one reflective structure may include a plurality of Fabry-Perot interferometers serially disposed along the length of the fiber to permit distributed sensing along the length of the fiber.

In yet another of its aspects the present invention may provide an optical sensing fiber having a core and a cladding layer disposed in optical contact with the core and may have a plurality of intrinsic Fabry-Perot interferometers serially disposed in the core along the length of the fiber to permit distributed sensing along the length of the fiber. The interferometers may each include at least one pair of reflective structures, and the reflectance of the at least one reflective structure may be 10% or less. The interferometers may include reflective structures formed by a discontinuity in refractive index and/or by damage to the fiber core.

Thus, the present invention may provide a method for fabrication of FBGs through the fiber coating using a near ultra-violet (UV) or visible laser whose pulse width may be 500 ps-100 ns, or even greater, for FBG fabrication with the grating defined by periodic variations in refractive index, i.e., "Type I" structures ("Type I" structures are defined herein to mean those involving a change in refractive index, without material damage. "Type II" structures are those which have physical damage to the material in which the structures are located.) The laser wavelength may be in the range of 390-600 nm. Significantly typical acrylate and polyimide fiber coatings are partially transparent to light in this spectral range. The partial transparency of the fiber coatings may cause part of the incident laser power to be absorbed. To avoid laser induced fiber coating damage, the laser beam may be focused to the fiber core with a cylindrical lens that has a relatively short focal length. As a result, the laser intensity at the focal point may be high enough to generate a level of fiber refractive index change useful for Type I FBG fabrication. At the same time, the laser intensity in the fiber coating may still be below the threshold to cause any damage to the coating material. Benefits for the use of a picosecond near UV or visible pulse laser include the creation of FBG inscription through the fiber coating with a significant reduction in the laser cost.

Type I reflective structures, such as FBGs, in accordance with the present invention written through the fiber coating may be particularly useful, because Type I gratings exhibit extremely low transmission loss. Consequently, a large number of Type I reflective structures may be multiplexed in a single fiber. In addition, for a distributed sensor system, many serial reflective structures, such as FBGs, may be cascaded in a fiber. Such an arrangement in accordance with the present invention allows one to avoid splices between gratings while maintaining the original fiber coating, for not only high fabrication efficiency, but also better fiber integrity and reliability. In short, it may be necessary for a grating based sensing fiber to have serial reflective structures with the original continuous fiber coating intact, and, in one of its aspects, the present invention offers the ability to produce such structures in optical sensing fibers.

BRIEF DESCRIPTION OF THE DRAWINGS

The foregoing summary and the following detailed description of exemplary embodiments of the present invention may be further understood when read in conjunction with the appended drawings, in which:

FIG. 3C, 3D schematically illustrate exemplary configurations for symmetric placement of sensing material within the cladding on either side of the fiber core of an optical sensing fiber in accordance with the present invention;

DETAILED DESCRIPTION OF THE INVENTION

Figure 1A:
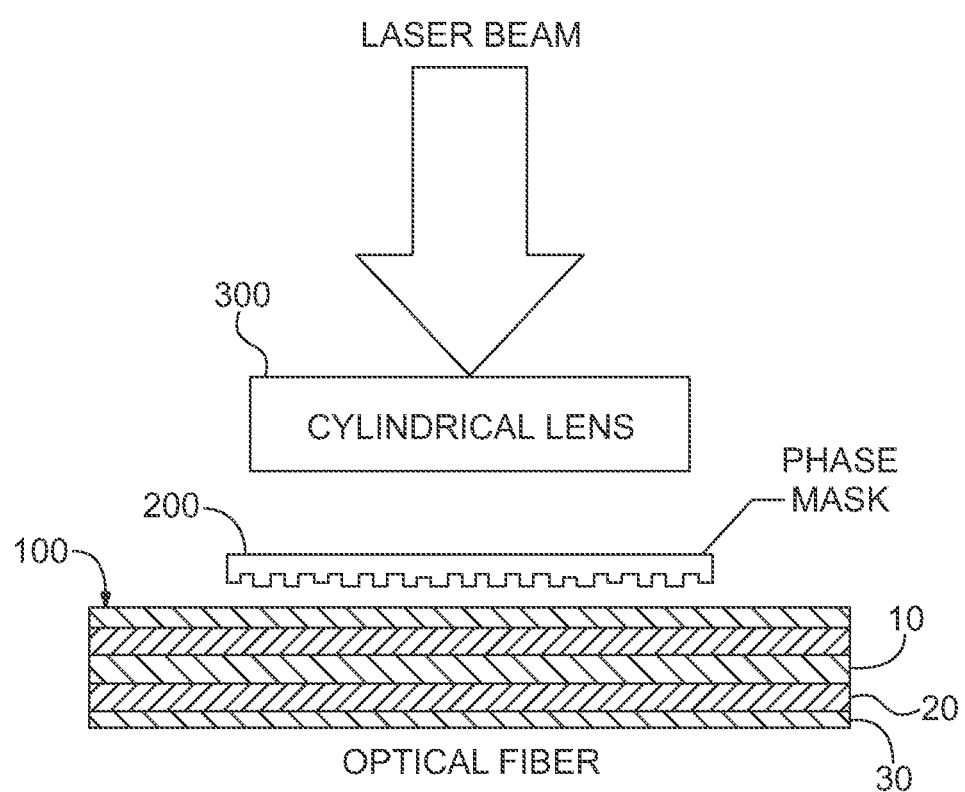
FIG. 1A schematically illustrates an exemplary apparatus and method for making an optical sensing fiber in accordance with the present invention having a grating disposed therein.

The present invention provides a number of structures and methods useful in the art of optical fiber sensors. For example, devices and methods of the present invention may provide optical sensing fibers having reflective structures disposed therein, which structures can provide at least two functions. A first function provided by the reflective structures of the present invention may be to reflect electromagnetic radiation out of the core of the fiber to provide electromagnetic radiation to an external detector. In this regard, reflective structures may take the form of a grating or a simple scattering structure, such as a point feature, for example. Alternatively or additionally, a second function that may be provided by reflective structures of the present invention may be analysis of the electromagnetic radiation propagating in the fiber to create a signal containing information to be detected. For example, reflective structures of the present invention may be oriented in the fiber core to provide one or more Fabry-Perot interferometers, in which case the analysis would be interferometry, and the resulting signal would include interferometric data. In certain configurations, interferometers included in the core of the fiber may be configured so that the interferometers do not direct electromagnetic radiation out of the core. In some configurations, an interferometer disposed within the core of the fiber may direct light out of the core of the fiber. Thus, reflective structures of the present invention may function to 1) eject electromagnetic radiation from the core the fiber, 2) create analytical data concerning the electromagnetic radiation propagating in the fiber, 3) or both, a grating being an example of the latter.

As an additional feature provided by devices and methods of the present invention, sensing materials may be disposed within the cladding of the fiber, which materials are responsive to the presence of a measurand to be detected and which materials may create a change in the electromagnetic radiation disposed within the core in response to the presence of the measurand. Fibers having sensing materials may also include the aforementioned reflective structures, so that, for example, the change created in electromagnetic radiation by the sensing materials may be directed out of the fiber core and/or further analyzed by the reflective structures.

The reflective structures may be disposed within the core or cladding of the fiber, and may be created by a change in refractive index without damage to the fiber (Type I features) or may be created by causing damage in the core of the fiber (Type II features), both of which may be termed "artificial reflectors," meaning those reflectors that can reflect light propagating in the fiber core but do not exist in the original fiber. Type II structures may be broadband in their reflective properties, possibly more so than Type I structures. Reflective structures may also be provided in the cladding of the fiber to reflect light propagating in the fiber core, so long as the reflective structures are located proximate the core-cladding interface where the evanescent field is coupled into the cladding. Reflective structures in accordance with the present invention may be created artificially after the fiber is drawn by different methods. Generally speaking, any changes in the fiber refractive index along the fiber axis can produce a reflection to the light propagating in the fiber. The index change may be localized such a point glass damage or is spatially repeated for periodical or quasi-periodic index variations.

Figure 2:
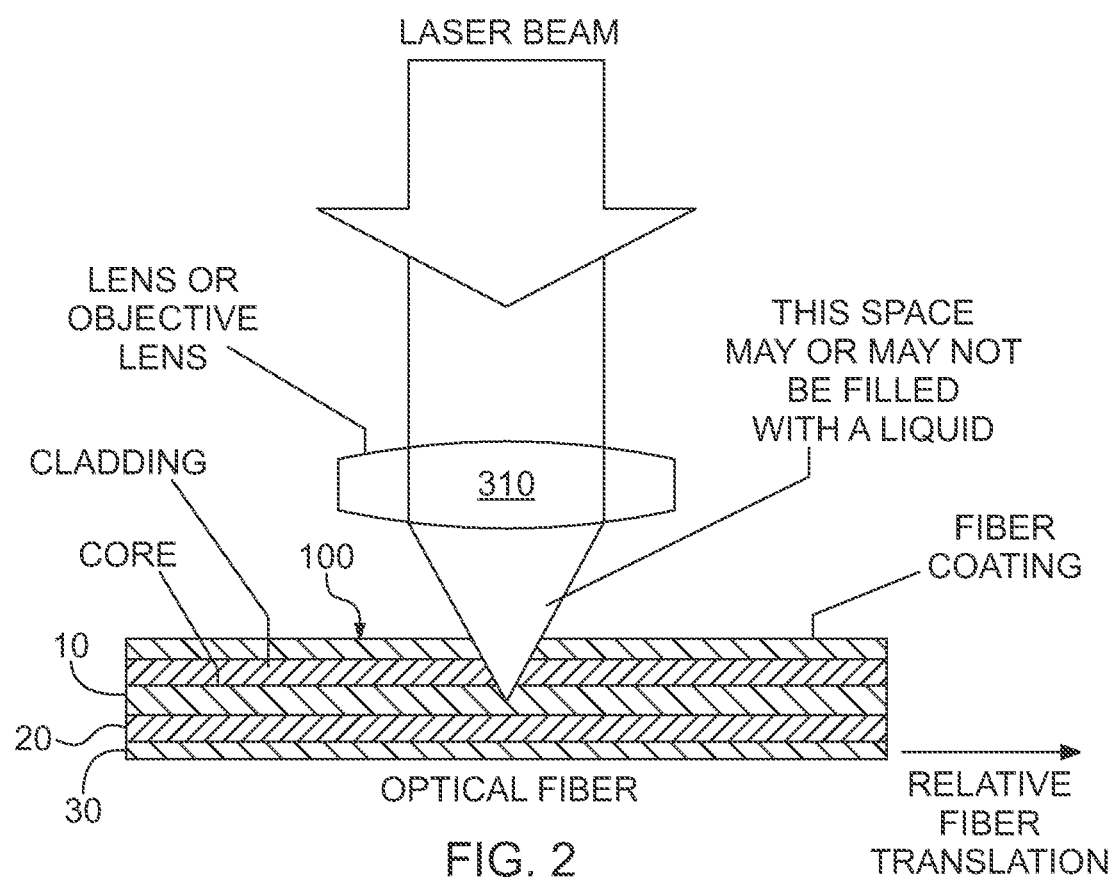
FIG. 2 schematically illustrates an exemplary apparatus and method for making an optical sensing fiber in accordance with the present invention involving focusing electromagnetic radiation through the fiber cladding in the fiber core to create at least one reflective structure in the core at the focus location.

Referring now to the figures, wherein like elements are numbered alike throughout, FIGS. 1A, 2 schematically illustrate exemplary devices and methods in accordance with the present invention for creating Type I FBGs in the core 10 of an optical fiber 100 through the fiber cladding 20 and coating 30. A FBG is an inline fiber component that involves periodic variation in the fiber refractive index either in the core or cladding or both. The FBG generally reflects light within a narrow band optical spectrum and the center wavelength as dictated by the grating optical period, given by the product of the geometric distance between two neighboring peaks of index variations and the effective index of the fiber.

In FIG. 1A, a picosecond pulse laser beam with a wavelength in the near UV or visible range may be incident to a phase mask 200. The phase mask 200 may be a dielectric material that is transparent to the laser, and may be a uniform phase mask with 1050 nm features available from Phasemask Technology, LLC, CA. The mask 200 may have different time delays for different positions on it. Therefore, the laser beam after transmission through the phase mask may have different optical phases at different positions. A suitable phase mask 200 for FBG fabrication may include periodic phase variations along the fiber direction such that the incident laser beam is split into +1 and −1 diffraction beams that travel toward different directions, and the interference of these beams may result in a set of interference fringes. As shown in FIG. 1A, these fringes may be focused by a cylindrical lens 300 into the fiber core 10 for FBG fabrication through the fiber photorefractivity. The fiber core 10 may be hydrogen loaded to increase its photosensitivity.

Figure 1B:
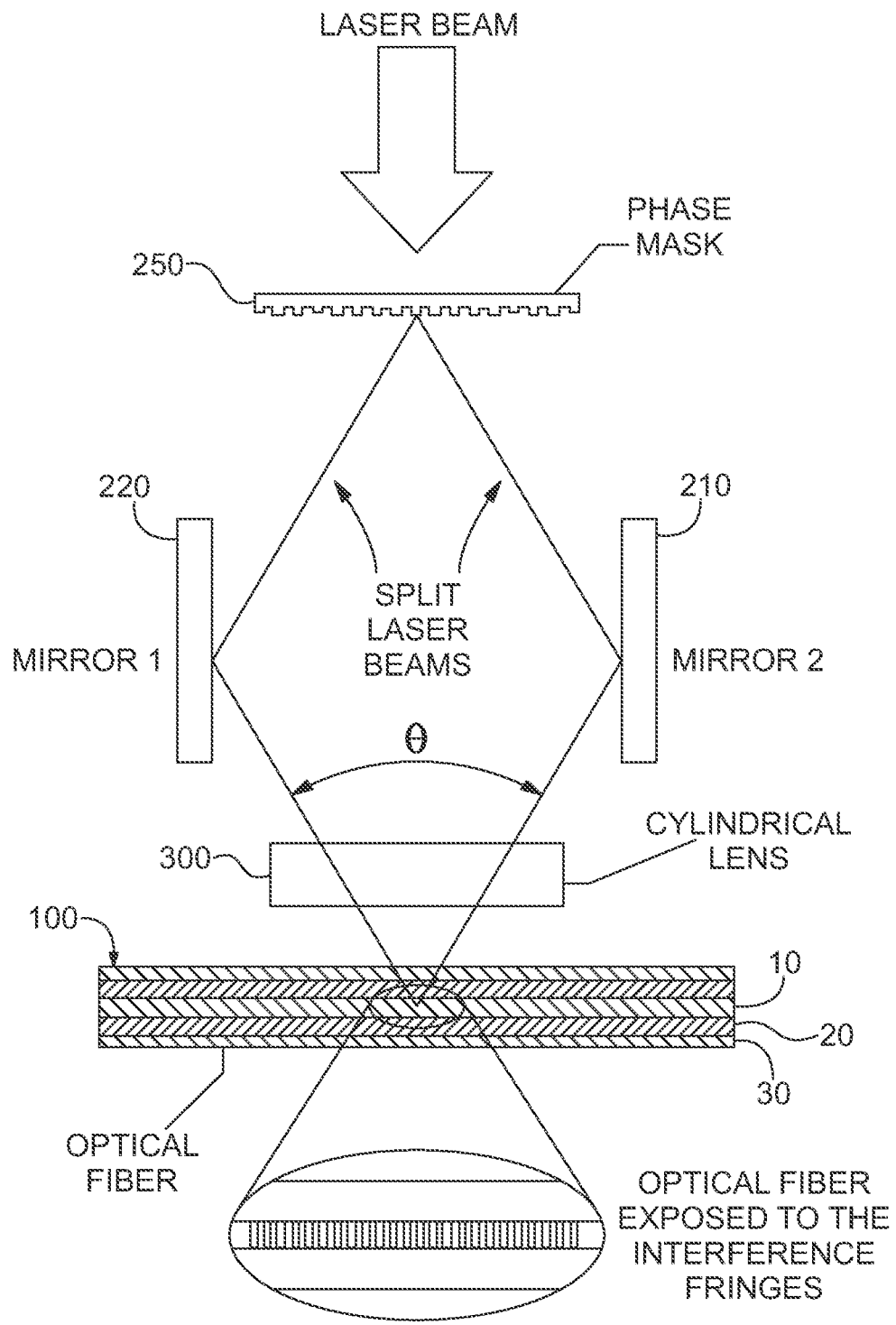
FIG. 1B schematically illustrates a further exemplary apparatus and method for making an optical sensing fiber in accordance with the present invention having a grating disposed therein.

The operation of the system in FIG. 1B may be similar to the one as described in FIG. 1A, with a difference being the manner in which the optical interference fringes are generated. In the system of FIG. 1B, the incident laser beam is first split into two beams by an optical element 250, which may include a phase mask or an optical beam splitter such as a right angle prism or a dielectric film coated slab. The two beams may then be reflected by two mirrors 210, 220 which meet at an angle θ as shown in FIG. 1B. The spatial period of the interference fringes along the fiber direction is related to this angle. One advantage of this system versus the one in FIG. 1A is that the same system can be used to write FBGs at varying wavelengths simply by the control of angle θ for the given laser and the fiber. It should be pointed out that these two FBG writing schemes are just examples. Other possible optical arrangements for the fabrication of Type I FBGs through the acrylate or polyimide coating of standard telecommunication optical fiber, such as Corning SMF-28 or alike, may be performed in accordance with the present invention.

Turning to FIG. 2, in another of its aspects, point glass damage in the core 10 of an optical fiber 100 and further Type II FBGs in accordance with the present invention may be provided by point-by-point damage using the setup of FIG. 2. Type II reflective structures may have a high loss to transmission if they are highly reflective, but damage-based reflective structures can exhibit excellent thermal stability even at very high temperatures. Also, some applications may require fiber partial reflectors that can reflect a very broadband optical spectrum. A single point glass damage in the core of an optical fiber can serve these needs well. Also, a single damage point may show a low transmission loss and may permit the use of serial single damage point based reflectors in a fiber for distributed sensing or other purposes.

A pulsed laser beam may be focused in the core 10 or cladding 20 of a fiber 100 by a lens 310, such as an objective lens which may be an oil immersion lens; the refractive index of the liquid may match that of the fiber coating 30. The laser may be pulsed with a pulse width ranging from 10 femtoseconds to 1 millisecond. The laser beam may be focused through the fiber coating 30 into the fiber 100, typically into the fiber core 10, and the focal point may be positioned at the center of the fiber core 10. The laser pulse energy or peak power or both and number of pulses may be controlled such that the fiber material can be 'damaged' to produce a permanent refractive index change only at the laser focus or its proximity without noticeable damage to the other regions of the fiber 100 and to the fiber coating 30.

The laser radiation wavelength may range from near ultra-violet (UV) through the visible. The laser pulse width may vary from attoseconds to microseconds, although a pulse width in the range of at least 500 picoseconds may be preferred. The pulse repetition rate, pulse width and peak power may be controlled to achieve the best reflector fabrication result in terms of fabrication quality and efficiency for desired reflectance and transmittance in a given optical fiber.

To reduce the laser cost, reducing the requirement on the laser pulse width may be important. In the meantime, to offset the laser peak power reduction effect, reducing the laser wavelength may be important owing to the fact that the glass damage threshold rapidly declines as the laser wavelength decreases. In the laser selection, it is desirable to choose the laser wavelength such that the light can transmit through the common fiber coatings such as acrylate and polyimide. Given these factors, a picosecond laser whose wavelength is in the range of 390-600 nm may be a good candidate for Type II FBG and point glass damage reflector fabrication. Although the photorefractivity for wavelengths greater than 350 nm, especially in the visible (400-700 nm), may be weaker or much weaker, it is still useful for the fabrication of FBGs having a reflectance below 10% or smaller. The specifications for this laser may be useful for Type I FBG fabrication through the fiber coating as described above. The laser may be a picosecond pulse laser at 532 nm.

To fabricate a Type II FBG, the fiber or lens may be mounted on a precision linear translation stage so the position of the fiber core can be changed incrementally point by point. The distance between two neighboring damage points may be designed to reflect a desirable wavelength via the first, second or even higher order grating structure. The order of an FBG is given by $m\lambda_B = 2n_{eff}\Lambda$ where m is the grating order, $\lambda_B$ is the Bragg wavelength, $n_{eff}$ is the effective index of the fiber, and $\Lambda$ is the grating period.

In another of its aspects, the present invention may relate to methods for the fabrication of optical fiber Fabry-Perot interferometers (FPIs) and other fiber inline reflectors, such as intrinsic FPIs (IFPI), for example. In an IFPI, the light remains in the fiber. The desired optical reflections may be produced by inline fiber reflectors, such as damage points made by the technique described in connection with FIG. 2. Thus, the fabrication can take place without the need for coating removal with the exception of a metal coating.

In a further aspect, the present invention may provide a sensing fiber that contains functional sensing materials, FIGS. 3A-3F. The functional materials may be applied in two ways: internal to the cladding of an optical fiber, FIGS. 3A-3E, or as a coating to the fiber, FIG. 3F. With regard to the former, an optical fiber 400 may incorporate sensing functional materials 450 in the fiber cladding 420 to make the fiber 400 sensitive to various measurands, FIGS. 3A, 3B. The sensing fiber 400 may have longitudinal holes 410 in the fiber cladding 420; these holes 410 may include various sensing functional materials 450 therein, which may be liquids or solids. The functional materials 450 may tend to change their dimensions in both the radial and the longitudinal directions when they are exposed to a measurand, e.g., a physical, a chemical or even a biological quantity, such as magnetic fields, electric fields, chemical gases, etc. For example, a magnetostrictive material may change its dimensions under magnetic fields. When a functional material 450 responds to the presence of a measurand by changing its dimension, the dimensional change of the functional material 450 will stretch the fiber 400 to cause a longitudinal strain along the fiber axis. As a result, stresses may be induced in the fiber core 410, which may produce an optical birefringence which may affect the light polarization, which change in polarization can be detected. Some commonly known materials suitable for use as functional materials 450 include Terfenol-D, Metglas® (Metglas®, Inc., North Carolina), and nickel. Another example functional material is a piezoelectric material for electric field measurement.

Figure 3A:
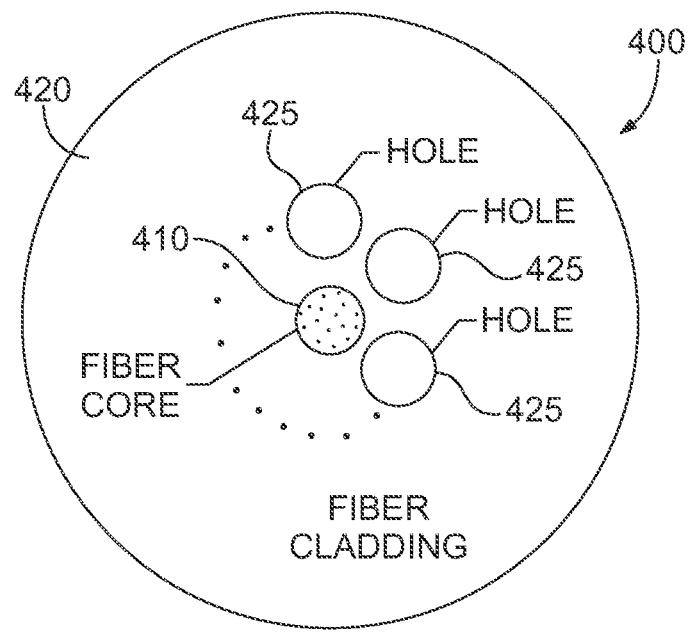
FIG. 3A schematically illustrates an exemplary optical sensing fiber in accordance with the present invention having a plurality of holes disposed in the cladding layer.
Figure 3B:
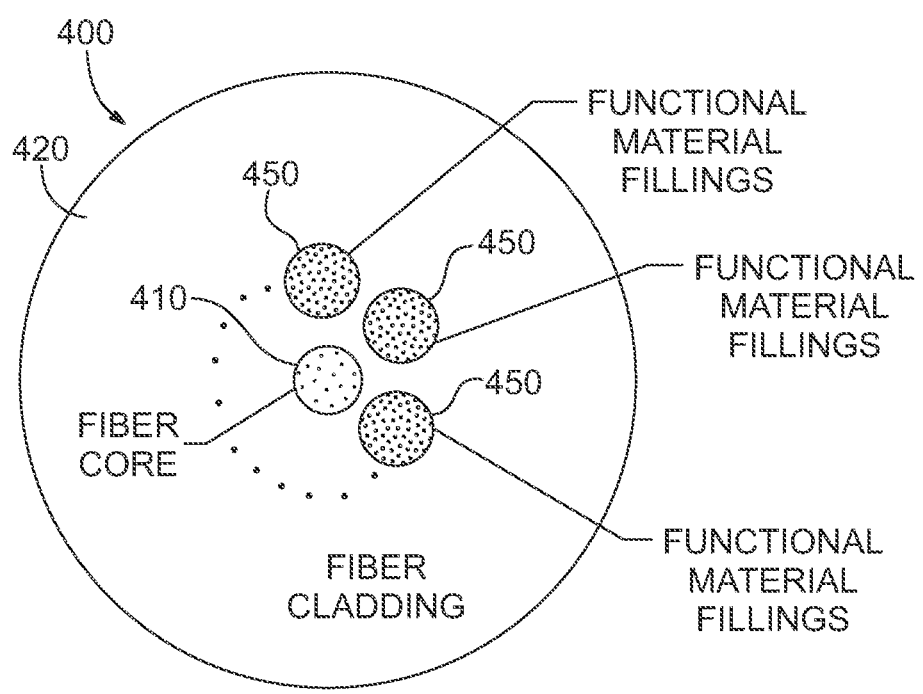
FIG. 3B schematically illustrates the optical sensing fiber of FIG. 3A with sensing material disposed in the holes of the cladding layer.
Figure 3C:
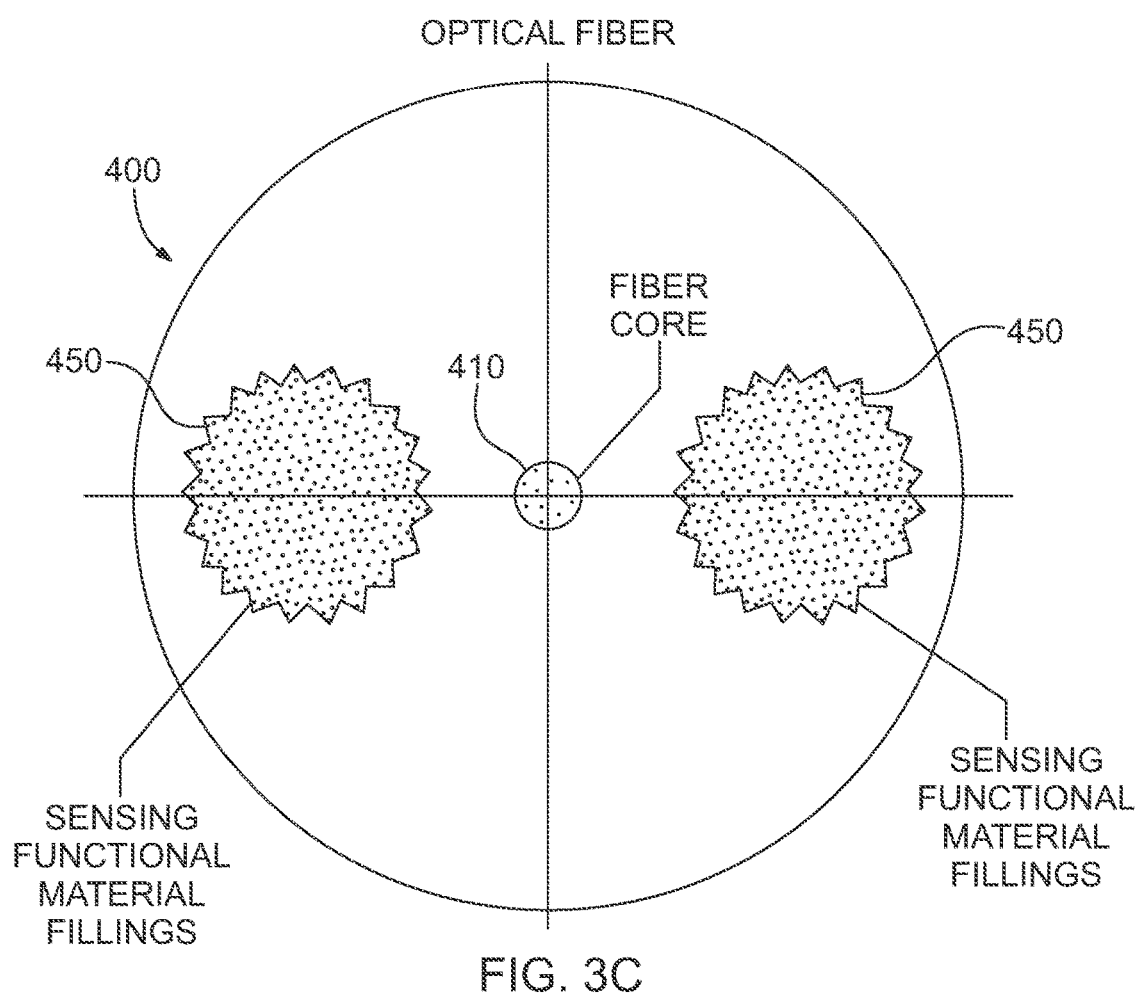

The number of holes 410 and the cross-sectional geometries thereof may vary from fiber to fiber. The holes 410 may be filled with one type or different types of sensing functional materials 450. Methods and apparatus for providing holes in optical fibers include US20070062337, US20080148777, U.S. Pat. No. 5,627,921, which are incorporated herein by reference. Several examples of fibers with various geometrical locations and configurations of functional materials are shown in FIGS. 3C, 3D. The number of holes may vary, and the size, cross-sectional geometry and hole-to-fiber core distance of each hole may vary. The spatial separation between two neighboring holes may or may not be constant. In one particularly desirable configuration, the sensing functional materials are located symmetrically relative to the center of the fiber along the diameter of the fiber on opposing sides of the core 410, FIG. 3C, 3D. In addition to fillings in an optical fiber, a sensing functional material may also be coated to the fiber surface as shown in FIG. 4. An intermediate layer may be applied between the fiber glass surface and the functional coating to improve the surface adhesion of the functional coating to the fiber to deter delamination. Intermediate layers for surface adhesion may also be applied between the fiber glass and the functional material to the other structures shown in FIGS. 3A-3E.

Another step may be taken after a functional material 450 is filled into or applied to a fiber 400. The functional material 450 may be treated under certain environmental conditions to increase the functional material sensitivity to the intended measurand. For example, a magnetostrictive material may be exposed to strong magnetic fields under elevated temperatures above the Curie value for an extensive period of time to increase the magnetostrictive coefficient of the material.

EXAMPLES

Example 1

Figure 3E:
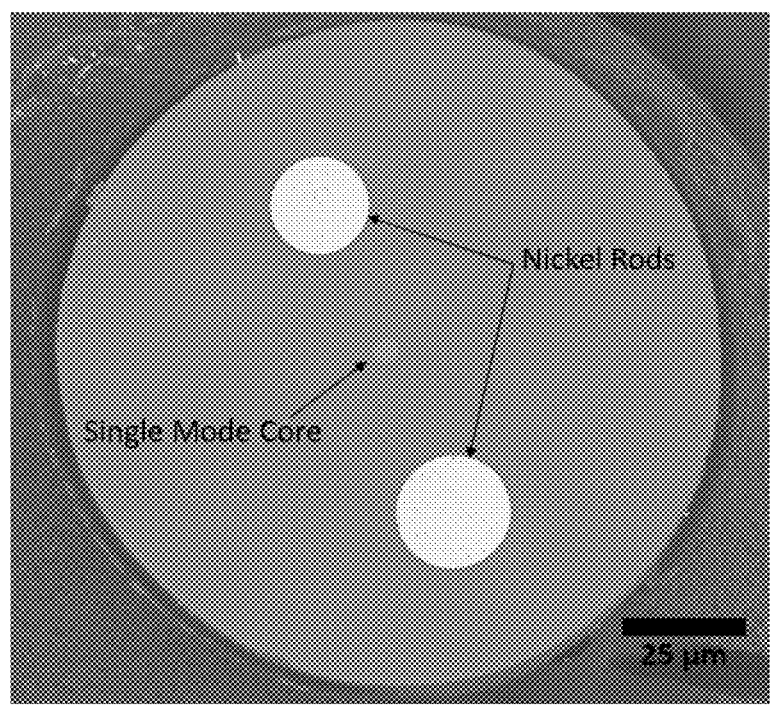
FIG. 3E shows a photograph of a cross section of an exemplary optical sensing fiber fabricated in accordance with the present invention to include sensing material disposed within the fiber cladding in the form of two nickel rods symmetrically placed from the fiber center along a fiber diameter.
Figure 4:
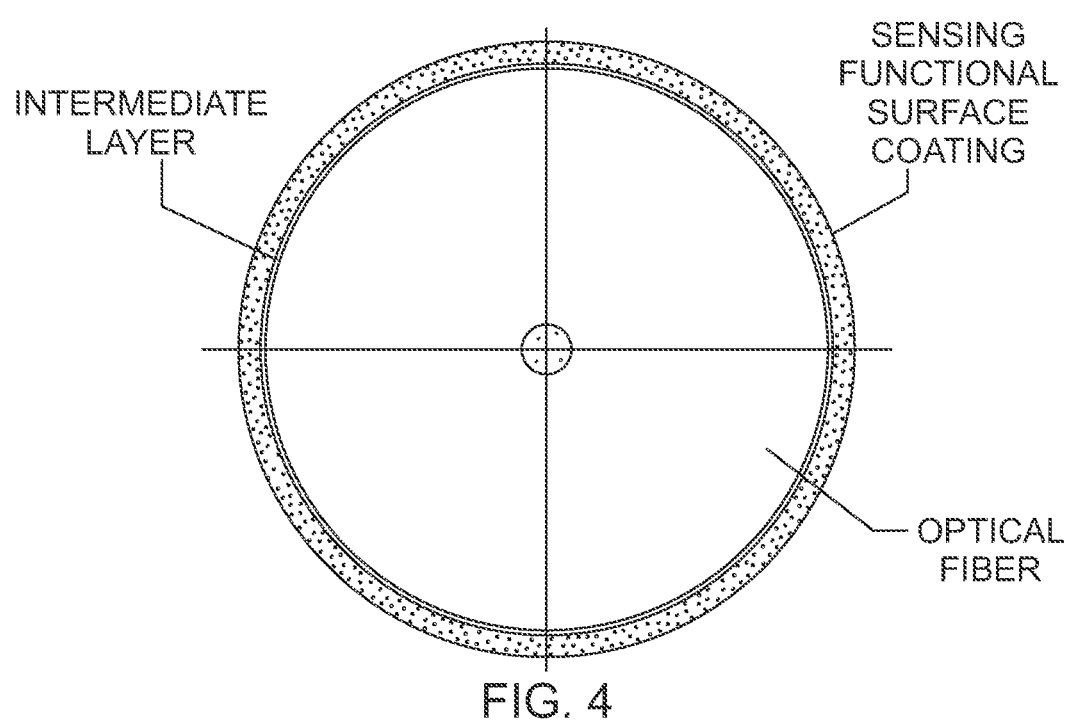
FIG. 4 schematically illustrates an exemplary optical sensing fiber in accordance with the present invention having a sensing material disposed around the cladding layer, with optional intermediate layer between the sensing material and cladding layer.

An exemplary optical sensing fiber of FIG. 3E was drawn from a special stacked preform design with a core rod in the center, surrounded by solid fused silica rods, and tubes filled with nickel, though other materials could be used such as Metglas® or Terfenol-D, in the form of a powder, wire or rod, for example. The nickel was positioned at a distance from the core to maintain the basic waveguide properties while also assuring the necessary sensor responsivity. Furthermore, the preform stacking and vacuum assisted draw approach enable the fiberization of long lengths of sensing fiber; as opposed to utilizing the glass drilling process which requires a significant capital expenditure to obtain the hole depths required for the material insertion. The diameter of the fiber was accurately controlled (±3 µm) and could be coated with any desired coatings such as acrylate, high temperature acrylate, silicone, carbon, and/or polyimide. The basic design allowed for any type of core rod to be used, such as germanium doped single mode or multimode or a pure silica core. Artificial reflectors, such as Type I FBGs, Type II FBGs, or single point glass damage reflectors may be inscribed in to the core region of the fiber. In this particular case two partial reflectors based on glass damage were provided at the two ends of the fiber, to provide a low-finesse Fabry-Perot interferometer in the fiber.

Figure 10:
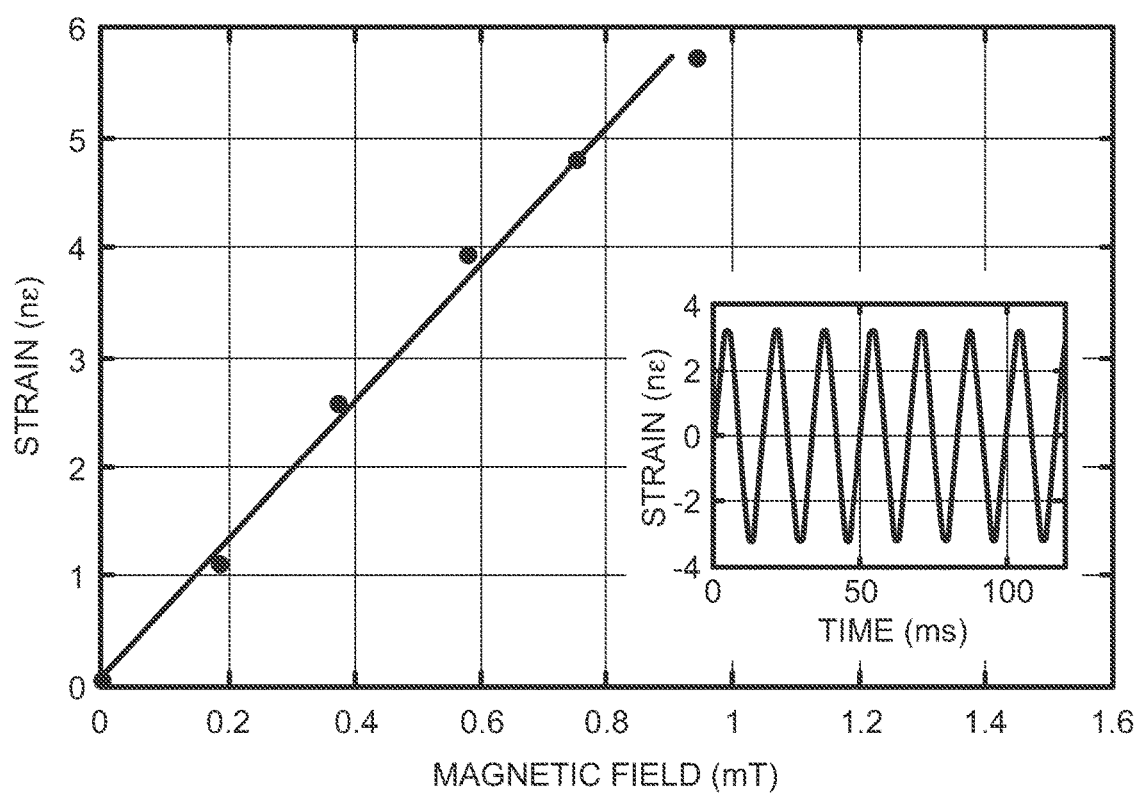
FIG. 10 shows the magnetic field response of the sensing fiber of FIG. 3E as a function of strain for an applied magnetic field, with the time response shown in the insert.

Performance of the fiber of FIG. 3E is shown in FIG. 10. The fiber was connected to a DASnova-02 optical interrogator (Sentek Instrument, LLC, VA). The response to a magnetic field generated produced by a basic air solenoid with alternating driving current was measured by the interrogator. Specifically, the optical path difference (OPD) between two adjacent reflectors was recorded against different strengths of magnetic fields, and the response is shown in FIG. 10.

Example 2

Figure 5A:
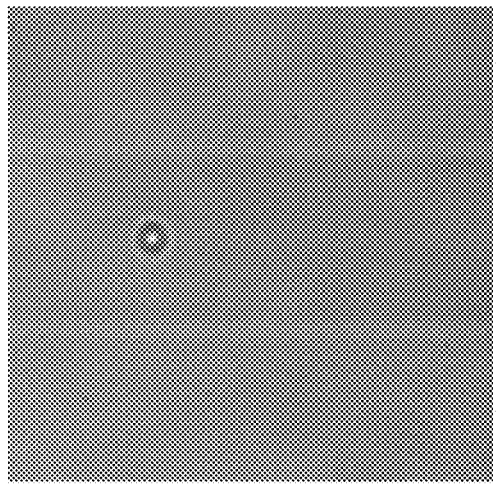
FIG. 5A shows a photograph of an exemplary damage-based inline fiber reflector in accordance with the present invention, fabricated by focusing a picosecond pulsed laser beam at 532 nm into the core of a polyimide coated silica fiber which may be created by the apparatus of FIG. 2.
Figure 5B:
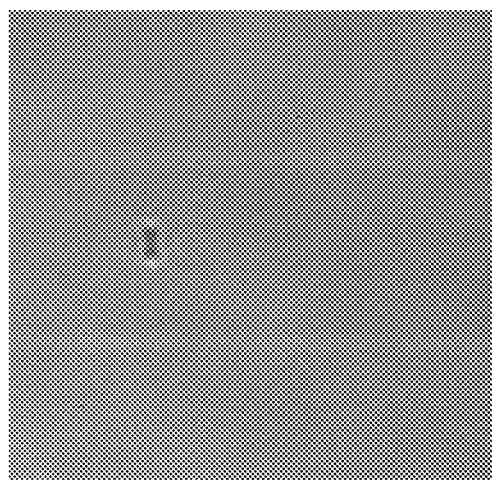
FIG. 5B shows a photograph of an example of glass damage with an elongated geometry disposed in a fiber core in accordance with the present invention which may be created by the apparatus of FIG. 2.

In another example, FIG. 5A shows glass-damage-based inline fiber reflectors fabricated using the technique of FIG. 2. An index matching oil with an index of refraction of 1.46 was applied to the space between the front end of the objective lens and the fiber. A 7 ps pulsed laser beam at 532 nm was focused into the core of a polyimide coated silica fiber. The glass damage size and geometry could be varied by the use of lenses with different numerical aperture, focal length, and aberrations by the control of the index of refraction of the liquid or by the dithering of the relative position between the laser focus and the fiber core. FIG. 5B presents an example of a glass damage with an elongated geometry fabricated in accordance with the present invention.

The fibers shown in FIGS. 5A, 5B had a polyimide coating which is a high temperature polymer which can be used at temperatures up to and beyond 300 C. In addition to polyimide coating, the technique of this example could also be applied to other fiber coatings which may include acrylate coatings and mid-temperature acrylate coatings. Besides these transparent or semi-transparent coatings, the invention may also be applied to a metal coated fiber. (In this case, the metal may need to be removed locally by a mechanical, chemical or optical means to expose the fiber glass before a reflector is produced in the fiber. For example, the same laser that is used to produce the reflector may be used to ablate the metal coating first by proper control of the laser intensity on the coating surface and the laser pulse repetition rate.)

Example 3

Figure 5C:
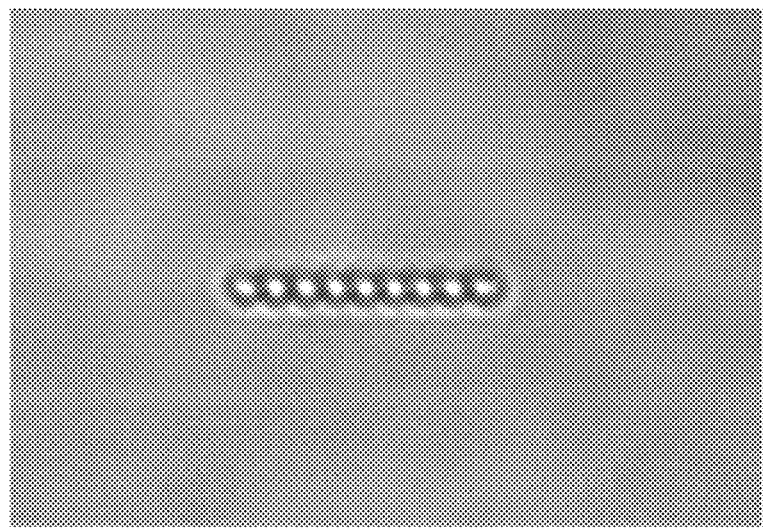
FIG. 5C shows a photograph of a plurality of consecutive damage points disposed in a fiber core to form a fiber inline partial reflector in accordance with the present invention which may be created by the apparatus of FIG. 2.
Figure 6:
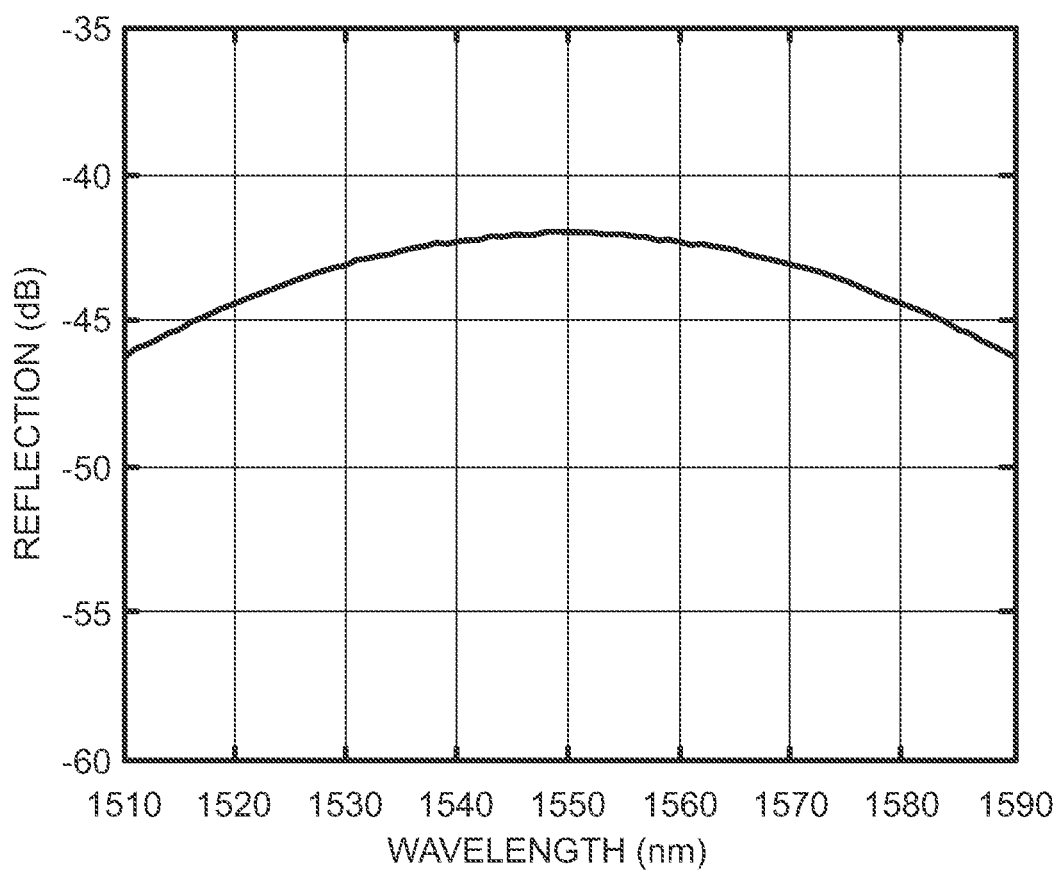
FIG. 6 illustrates the reflection spectrum for the inline partial reflector of FIG. 5C.

Generally, a single glass damage point can serve as a broadband partial optical reflector in a fiber, FIG. 5A. However, a number of consecutive damage points were fabricated as shown in FIG. 5C by the technique of FIG. 2 to form an inline partial reflector. These points are usually periodic but are not necessarily so. In the case of a periodic arrangement, the period of these points was determined by the operating center wavelength $\lambda$ as $m\lambda=2\Lambda n_{eff}$ where $\Lambda$ is the geometric distance between two neighboring damage points, $n_{eff}$ is the effective refractive index of the fiber, m is an integer, which is often referred to as the order of the fiber Bragg grating. A multiple point based reflector may allow tailoring of the reflection spectrum to a desirable profile including a narrowed reflection spectrum. Also, a multiple point based reflector may be designed to reduce the light transmission loss. The reflection spectrum from the 9 damage points based reflector of FIG. 5C is given in FIG. 6.

Figure 7:
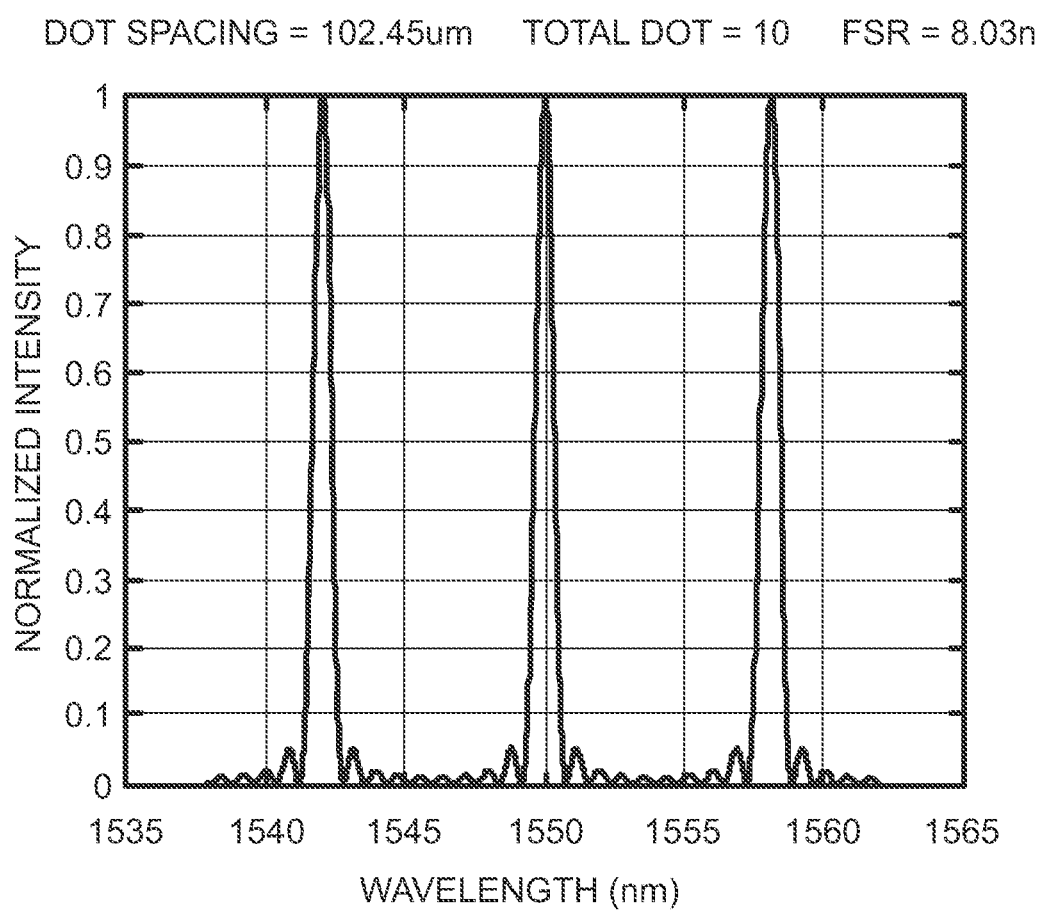
FIG. 7 illustrates the normalized intensity spectrum for a $193^{th}$-order fiber Bragg grating with 10 damage points disposed in the fiber core in accordance with the present invention.

Narrower or much narrower spectrum of a reflection peak may be achieved by the use of a relatively small number of damage dots and a higher order FBG. FIG. 7 provides one example of the theoretical performance of a 193-order FBG design with 10 damage points.

Example 4

Figure 8:
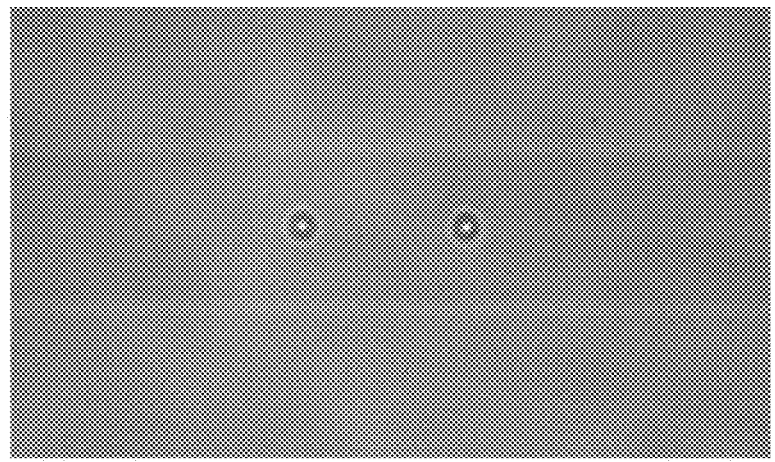
FIG. 8 shows a photograph of an exemplary intrinsic Fabry-Perot interferometers disposed in a fiber core having two reflectors in accordance with the present invention.
Figure 9:
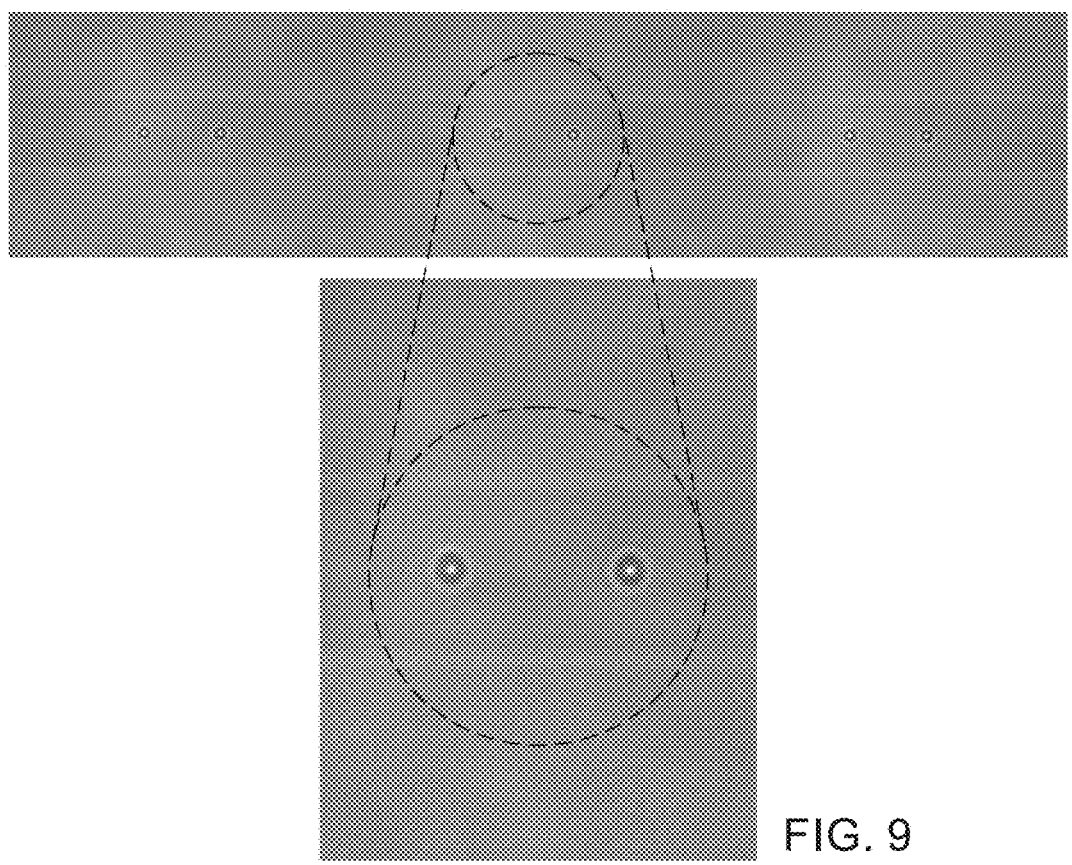
FIG. 9 shows a photograph of an exemplary configuration of three serial Fabry-Perot interferometers disposed in a fiber core in accordance with the present invention.

An IFPI was formed by creating two reflectors separated by a selected distance by the method of FIG. 2, as shown in FIG. 8. The distance between the two reflectors may be as short as a few micrometers or as long as meters. Further a number of serial IFPIs were fabricated in a fiber by this technique. FIG. 9 shows an example of 3 serial IFPIs in one fiber. In this example, each reflector in an FPI that had one damage point only. A reflector may also be formed by multiple damage points, which may or may not have equal spacing.

In general, the localized glass damage based formation of inline reflectors and further IFPIs or serial IFPIs may be realized in various types of fiber. These fibers may include but are not limited to single-mode or multimode fibers. They may also be silica fiber with chemical dopants such as germanium and fluorine in the fiber core or in the cladding or in both. The fiber may also have no dopants at all and light confinement is realized by microstructures such as orderly or random holes in the fiber cladding, where the fiber core may be pure silica or may be air or vacuum. In the air core case, the inline reflectors may be fabricated in the fiber cladding or holey region. As mentioned before, the fiber may also have different types of coatings, which may include but are not limited to acrylate, mid-temperature acrylate and polyimide. Fiber reflectors and IFPIs may also be fabricated in metal or carbon coated optical fiber via localized coating removal to expose the fiber material.

The serial IFPIs in a fiber may be interrogated by various methods which may include but are not limited to tunable laser based optical time domain reflectometry (OTDR) as described in US20140152995, incorporated herein by reference. This technique may permit the accurate measurement of the optical path distance (OPD) of each IFPI. The OPD is given by $OPD=2n_{eff}L$ where $n_{eff}$ is the effective refractive index of the fiber and L is the geometrical distance between the two reflectors. Since the OPD is dependent on temperature or strain, the serial IFPIs can be used along with the IFPI interrogator as a distributed temperature sensor (DTS) or distributed strain sensor (DSS). The IFPI array may also be used to measure a variety of other quantities that can change the IFPI OPDs.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A method for creating an optical sensing fiber having a reflective structure integrally disposed therein, comprising:
   providing an optical fiber having a core and a cladding layer disposed in optical contact with the core, and having a polymer coating layer disposed in contact with and surrounding the cladding layer, the polymer coating layer at least partially transparent in the wavelengths of 390-600 nm;
   providing a source of electromagnetic radiation having a wavelength in the range of 390-600 nm; and
   delivering a selected wavelength of the electromagnetic radiation through the polymer coating layer to a selected location within the core or cladding layer such that the delivered electromagnetic radiation alters the core or cladding layer to create at least one reflective structure in the core or cladding layer at the selected location, wherein the step of delivering the electromagnetic radiation comprises pulsing the source of electromagnetic radiation with a width of at least 500 ps, wherein the optical fiber comprises first and second sensing materials symmetrically disposed in the cladding layer at opposing locations across the core, the sensing materials structured to exhibit a change in response to the presence of a selected measurand.

2. The method according to claim 1, wherein the at least one reflective structure comprises a change in refractive index at the selected location.

3. The method according to claim 2, wherein the change in refractive index is in the range of $1\times10^{-10}$ to 0.32.

4. The method according to claim 1, wherein the at least one reflective structure comprises damage localized to the region of the at least one reflective structure.

5. The method according to claim 4, wherein the region of damage is in the range of 0.1 to 10 µm in length along the direction of the fiber axis.

6. The method according to claim 1, wherein the reflectance of the at least one reflective structure is 10% or less.

7. The method according to claim 1, wherein the reflectance of the at least one reflective structure is 1% or less.

8. The method according to claim 1, wherein the at least one reflective structure comprises a plurality of reflective structures.

9. The method according to claim 1, comprising moving the source of electromagnetic radiation relative to the optical fiber to a plurality of locations, and wherein the step of delivering the electromagnetic radiation comprises focusing electromagnetic radiation at each of the plurality of locations to create a plurality of reflective structures.

10. The method according to claim 1, wherein the at least one reflective structure comprises two reflective structures disposed at locations within the core of the fiber to provide a Fabry-Perot interferometer therebetween.

11. The method according to claim 10, comprising a plurality of Fabry-Perot interferometers serially disposed along the length of the fiber to permit distributed sensing along the length of the fiber.

12. The method according to claim 1, wherein the at least one reflective structure comprises a plurality of reflective structures arranged in periodic repeating spacing to provide a grating within the core.

13. The method according to claim 12, comprising a plurality of gratings serially disposed along the length of the optical fiber to permit distributed sensing along the length of the fiber.

14. The method according to claim 1, wherein the core comprises silica glass and the polymer coating layer comprises an acrylate or polyimide.

15. The method according to claim 1, wherein the selected wavelength is in the range of 515-600 nm.

16. The method according to claim 1, wherein the step of delivering the electromagnetic radiation comprises focusing with a cylindrical lens having a focal length of 10 mm or less.

17. The method according to claim 1, wherein the step of delivering the electromagnetic radiation comprises creating interference fringes at the selected location.

18. The method according to claim 1, wherein the selected location is proximate the core-cladding interface.

19. The method according to claim 1, wherein the power at the selected wavelength of electromagnetic radiation is no more than 5 µJ.

20. The method according to claim 1, wherein the measurand is a magnetic field, and the sensing materials comprise a magnetostrictive material that changes its dimensions under the influence of the magnetic field.

21. The method according to claim 1, wherein the measurand is a change in temperature, and the sensing materials are configured to change dimensions in response to the change in temperature.

22. The method according to claim 1, wherein the measurand is a strain force, and the sensing materials are configured to change in response to the change in the amount of strain.

23. The method according to claim 1, wherein the sensing materials are piezoelectric.

24. The method according to claim 1, wherein the sensing materials comprise nickel, Metglas, Terfenol D, and combinations thereof.

25. The method according to claim 1, wherein the cladding layer comprises one or more holes extending longitudinally therethrough parallel to the optical axis of the optical fiber, and wherein the sensing materials are disposed within the holes.

26. The method according to claim 1, wherein the sensing materials comprise one or more of a solid and a liquid.

27. The method according to claim 1, wherein the first and second sensing materials comprise different materials.

28. The method according to claim 1, wherein the at least one reflective structure comprises a discontinuity in refractive index.

29. The method according to claim 1, wherein the at least one reflective structure comprises damage to the core.

30. The method according to claim 1, wherein the at least one reflective structure comprises a plurality of gratings serially disposed along the length of the optical fiber to permit distributed sensing along the length of the optical fiber.

31. The method according to claim 1, wherein the at least one reflective structure comprises a plurality of Fabry-Perot interferometers serially disposed along the length of the optical fiber to permit distributed sensing along the length of the optical fiber.

32. The method according to claim 1, wherein the optical fiber includes a plurality of intrinsic Fabry-Perot interferometers serially disposed in the core along the length of the optical fiber to permit distributed sensing along the length of the optical fiber.

33. The method according to claim 32, wherein the interferometers each include at least one pair of reflective structures.

34. The method according to claim 33, wherein the reflectance of the at least one reflective structure is 10% or less.

35. The method according to claim 33, wherein the reflectance of the at least one reflective structure is 1% or less.

36. The method according to claim 32, wherein the interferometers comprise reflective structures formed by a discontinuity in refractive index.

37. The method according to claim 32, wherein the interferometers comprise reflective structures formed by damage to the core.

38. The method according to claim 32, wherein the at least one reflective structure comprises a plurality of reflective structures.

* * * * *